United States Patent Office 3,228,877
Patented Jan. 11, 1966

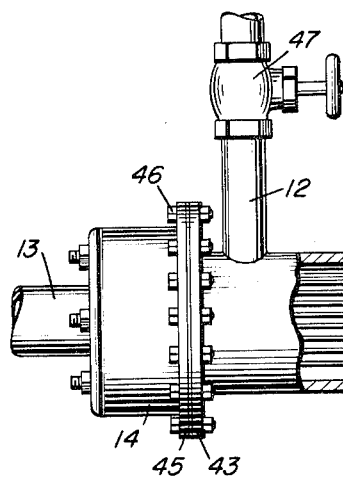
FIG. 1
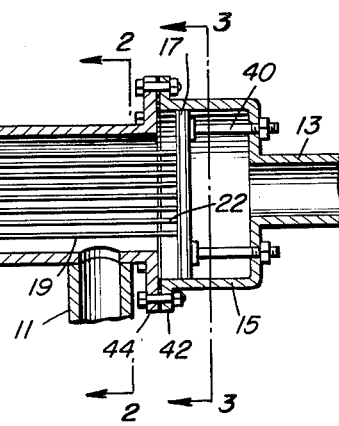
FIG. 2  FIG. 3
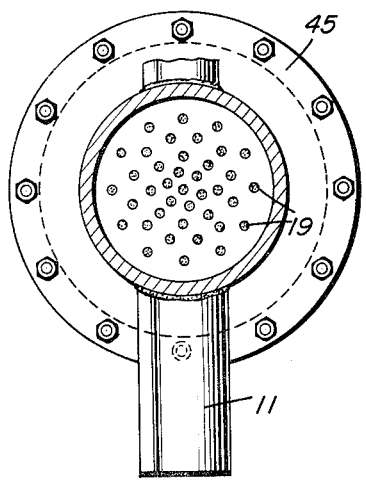
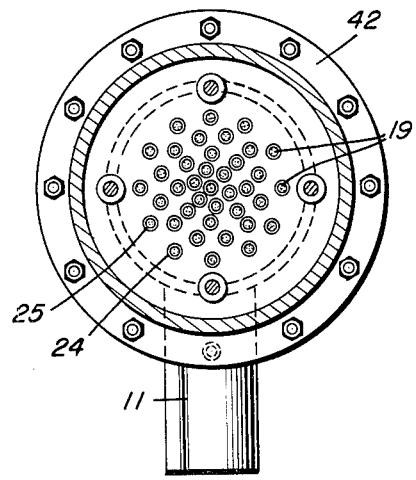
FIG. 4
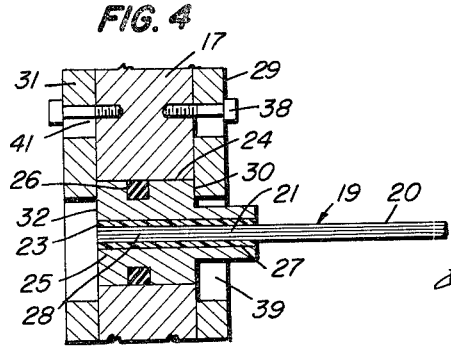
INVENTOR
Henry I. Mahon
BY
ATTORNEY

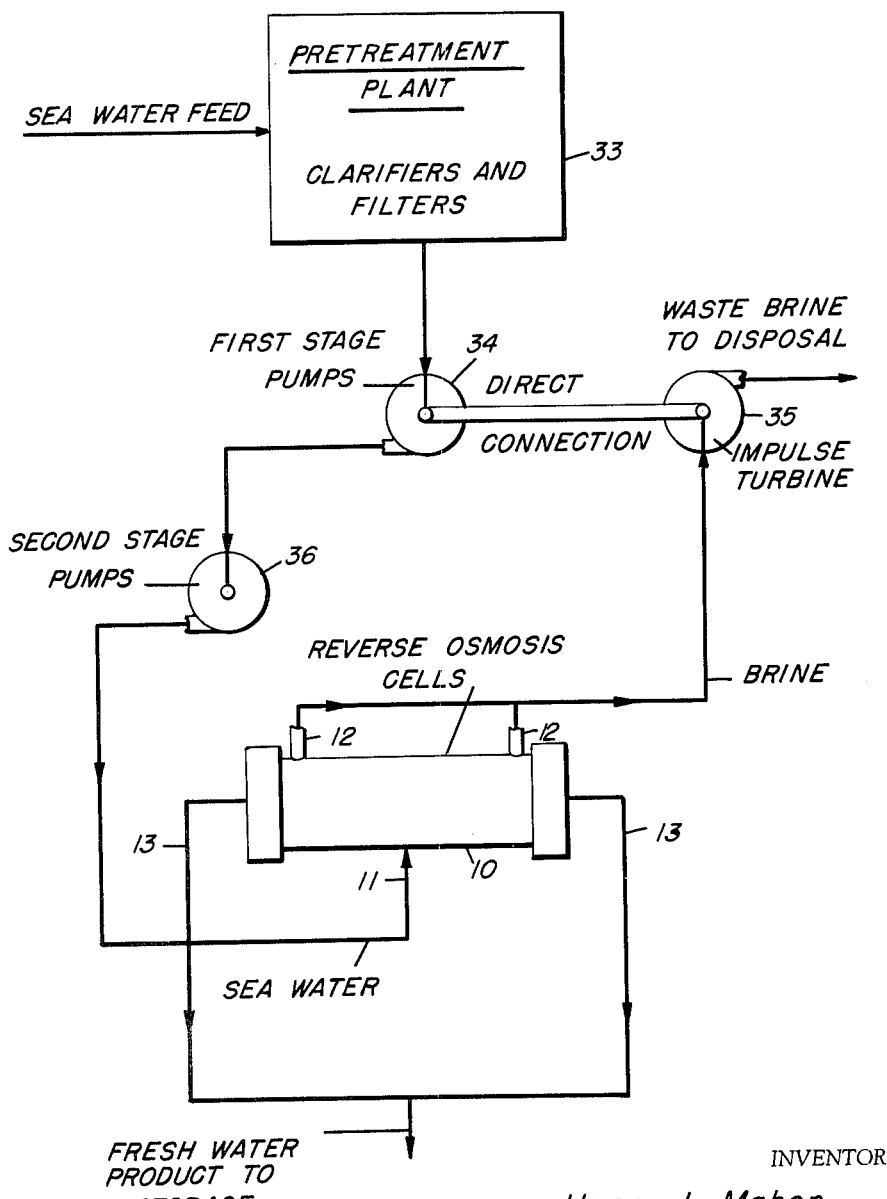

3,228,877
PERMEABILITY SEPARATORY APPARATUS AND PROCESS UTILIZING HOLLOW FIBERS
Henry I. Mahon, Walnut Creek, Calif., assignor to The Dow Chemical Company, Midland, Mich., a corporation of Delaware
Filed June 16, 1961, Ser. No. 117,647
7 Claims. (Cl. 210—22)

This application is a continuation-in-part of my copending application Serial No. 57,055 filed September 19, 1960 and entitled "Permeability Separatory Apparatus and Process of Using the Same."

This invention relates to permeability separatory apparatus and to the use of such apparatus to selectively resolve the different components of multi-component fluids.

In the course of development of laboratory and commercial separatory procedures a wide variety of generic systems of separation have been utilized, including such common expedients as filtration, evaporation and distillation. While these processes are commercially practicable for many separatory operations, they are oftentimes totally inadequate in numerous other similar operations. The effects of one or more of such factors as cost, bulk, elevated temperature destruction of separable components, low operating efficiency and the like are responsible for the short-coming. Additionally, in many instances, such processes are incapable of separating the desired fluid components.

In consequence, there has been for many years a concentrated effort to use semipermeable membranes as a separatory means. The already developed art encompasses a diversity of known membranes which have, to a greater or lesser degree, the property of being selectively permeable to different components of fluid mixtures. Thus, some membranes (of the type that are referred to as osmotic membranes) will pass water but restrain ions. Other membranes will selectively pass ions in solution. These are usually known as ion exchange membranes. Still other membranes possess selective permeation rates for two or more non-ionic components of fluid mixtures. Yet additional types of membranes are of the so-called molecular sieve type (such as those utilized for dialysis) which can pass ions or other materials but tend to restrain passage of high molecular weight components or, similarly, which are adapted to pass only certain molecular weight fractions of given materials, depending on actual molecular size and proportions thereof.

Despite the recognition of the inherent advantages that are achievable with permeability separatory apparatus, commercial adoption of such devices has been undertaken on only a very limited scale. The common inherent limitation that seems to militate against more widespread employment of the prior permeability separatory procedures has been the slow and relatively inefficient (at least for commercial purposes) rate of transfer of the desired component from one side of the membrane to the other.

The rate equation describing the flow of liquid through a membrane follows the general form of rate equations for mass transfer; i.e., Rate of mass transfer = Permeability Constant $\times$ Area $\times$ Driving Force $\times \dfrac{1}{\text{Resistance}}$ In this equation, the permeability constant depends on the material used in the membrane. Satisfactory choice of material for given purposes is determined to some extent by this factor. Suitable materials for various membranes are hereinafter more fully disclosed. The permeability constant also varies with the composition of the component to be separated, as well as its concentration in the untreated fluid. In this connection, it is normally found to be inexpedient or prohibitively expensive, or both, to vary this composition or concentration.

Thus, as is readily apparent, the optimum rate to be obtained in a given membrane transfer process will result when the area and/or driving forces are maximized and the resistance minimized.

It is an object of the present invention to provide a process and apparatus facilitating achievement of the above delineated optimums. More particularly, it is an object of the present invention to provide a permeability separatory apparatus and method of using the same which optimizes the mentioned variables.

This and other objectives, and cognate benefits and advantages, are possibilitated and achieved by means of a specific cell that incorporates a specific membrane element comprising a multiplicity of substantially unsupported, fine, continuously hollow fibers and, even more advantageously for most purposes, a multiplicity of bundles of substantially parallel multiplicities of such fibers in which the thin wall of each of the hollow fibers employed forms the transfer membrane area in and for the cell or element, all as hereinafter more particularly described and specified.

Prior art permeability membranes have consisted, for the most part, of thin, uniplanar plates rigidly supported on solid backing members. Obviously, in such apparatus, a plate of exceedingly large area or large pluralities of such uniplanar plates are necessary to achieve practical transfer rates. Additionally, in such installations, the backing plates take up space in considerable proportion and may be considered, at best, as mere "dead" weight. Besides, due to the necessary construction of such apparatus, the membranes tend to be relatively weak and susceptible to rupture in use.

Practice of the present invention, however, allows permeability separatory apparatus to be used for any of a wide variety of applications in which, as compared to previously known developments, great advantage can be derived from installations characterized in having exceedingly large transfer areas for given volumes of space occupied by the apparatus. Such desideration is readily accomplishable with the present membrane elements wherein, most beneficially, very large bundles of any desired plurality, even up to a million or more, of the hollow fibers that form the transfer area can be maintained, if desired, in spaces having cross sections no greater than an inch or so of width or diameter. The ratio of transfer area to apparatus volume achievable by present practice is invariably many times (and significantly) greater than may be had by following of prior art techniques. For example, practice in accordance with the present contribution to the art permits installations to be employed that have surface areas for transfer of material to be separated that are as much as ten thousand square feet (10,000 ft.$^2$) or more per cubic foot (ft.$^3$) of volume actually occupied by the installation. This represents a transfer area to apparatus volume ratio that is greater by a factor of at least 30 than the same characteristic in conventional apparatus for the same purpose, wherein (depending somewhat on the type anw configuration of the backing plates or other supports used for the membrane) the apparatus may provide only three hundred square feet (300 ft.$^2$) or less per cubic foot (ft.$^3$) of installation. Furthermore, surprising as it may seem, the thin-walled hollow fibers used in the present membrane elements achieve much greater membrane strength than is possible in prior art membranes having different configurations. This nicely overcomes difficulties occasioned by the requisite use, for purposes of adequate strength, of relatively thicker membrane materials. At the same time, backing plates and equivalent types of membrane supports are, as indicated, eliminated and avoided in the hollow fiber membrane elements of the invention.

One of the more promising applications of permeability separation has long been regarded as that of reverse osmosis, or ultrafiltration. If, for example, a fluid that contains water as a solvent with ions in solution therein is placed on one side of an osmotic membrane and the solvent (i.e., water) is placed on the other side of the membrane, the solvent will pass through the membrane into the ionic solution. The force causing this transfer varies with the character and concentration of the fluid involved. Nevertheless, such osmotic force is a specific measurable pressure for any given composition and concentration.

If there is now applied to the ionic solution a pressure in excess of this specific osmotic pressure, there is produced the process of reverse osmosis or ultrafiltration. In this phenomenon solvent from the ionized solution is forced through the membrane while the ions are rejected by the membrane. The exact mechanics of such a process are not absolutely known or determined. Whatever its cause or modus operandi, however, the reverse osmosis process functions at the prescribed pressures for almost all fluids, given an appropriate choice of membrane material.

The pressures required to produce reverse osmosis are, in most instances, substantial. In fact, for most commercial aqueous ionic solutions, a minimum of one hundred pounds per square inch is required to secure the desired reverse osmosis. Since the rate of mass transfer is directly proportional to pressure, it is easily evident that pressures of many hundreds of pounds per square inch are required to expeditiously use reverse osmosis. Such pressures, when utilized with uniplanar plate membranes, require that a difficult and expensive mechanism or backing plate for adequately supporting the membrane be utilized.

To attempt to lessen the shortcomings of the uniplanar membranes, tubular membranes having coextensive tubular backing or supporting elements have been utilized. Such tubular members are, by virtue of the laws of fluid pressure, better adapted to withstand higher pressures than the uniplanar membranes. However, these prior art tubular membranes again do not furnish sufficient area to make the rate of transfer high enough to be commercially feasible. And, as a further significant deficit, they are mechanically supported membranes having associated difficulties for such reason commensuarte with those above described in connection with supported uniplanar membranes.

The deficiencies of the prior art are overcome by the structure and method of the present invention which comprises essentially a permeability apparatus formed of a cell or cells incorporating in each cell a multiplicity of bundles, each consisting of a multiplicity of fine hollow fibers supported only at their terminal portions.

More particularly, the present invention is concerned with such a permeability cell in which the multi-component fluid composition or solution is passed around the exterior wall surfaces of a multiplicity of fine hollow fibers, supported only at their terminal portions. Where the invention is applied to reverse osmosis, the fluid on the exterior of the hollow fibers is maintained at a pressure in excess of the specific osmotic pressure, as discussed above. Where direct osmosis is involved, such pressure is, of course, absent.

An even more complete understanding of the nature and objects of the invention is afforded by reference to the accompanying drawing in connection with the following description and specification, wherein:

FIGURE 1 is a broken out elevational view, partly in section, of the overall structure of one embodiment of one of the permeability cells in accordance with the present invention;

FIGURE 2 is a cross-sectional view of the cell taken along 2—2 in FIGURE 1 with the locking plate omitted for clarity;

FIGURE 3 is a cross-sectional view of the end of the cell taken along 3—3 in FIGURE 1;

FIGURE 4 shows a preferred embodiment of the end seal for a hollow fiber bundle; and FIGURE 5 is a schematic flow diagram of a sea water conversion plant using the apparatus and process of the present invention.

Referring first to FIGURE 1, there is shown the overall structure of one embodiment of the basic permeability cell of the present invention. This is generally designated, in its entirety, by reference numeral 10. The cell 10 includes an inlet 11 for untreated fluid having, where reverse osmosis is utilized, means such as a pump or the like, not shown, to apply a desired fluid pressure to fluid entering inlet 11, and an outlet 12 for the discharge of the treated fluid, this outlet being positioned on the opposite side of the cell casing from inlet 11, it being understood that there may be more than one outlet, spaced along the axis of the casing. Additional outlets 13, 13 are formed for discharge of the fluid component after it has passed through the permeable membranes of the cell. At the exit end the outlets 13, 13 are fed by header chambers 14, 15. Situated between headers 14 and 15 and supporting the same is a casing 16. Advantageously, the casing 16 is tubular, although it may have other desired configuration. The casing 16 is sealed at its end from headers 14 and 15 by means of header end plates 17 and 18. Outlets 13, 13 provide an exit for fluid accumulated within the interior of the hollow fibers, as described in detail hereinafter, while outlet 12 carries off the treated fluids.

Positioned within the casing 16 are a multiplicity of bundles 19 of hollow, fine fibers 20. The nature of the hollow fibers 20 is hereinafter described in greater detail.

As is best shown in FIGURES 1 and 4, each of the bundles 19 has its terminal portions 21, 22 sealed to each other and to the walls of openings or passages in plates 17 and 18 by means of a suitable adhesive or cement, resin or the like, indicated generally at 23. These openings or apertures are designated 24. The adhesive seals the exterior terminal portions only of the fibers to each other and to the interior walls of the apertures 24. The bundles 19 are thus supported at their terminal portions only by the header plates. In this way, the opposite open ends of the many small hollow fibers are all in fluid communication with the header chambers 14 and 15. Each of the hollow fibers 20 in each bundle 19 has the same or about the same length. Likewise, it is generally desirable for the other dimensioned parameters of all the hollow fibers in each bundle (i.e., outside diameter and wall thickness) to be the same in each fiber although, if desired, bundles of fibers having different individual outside diameters and wall thicknesses may be employed. Similarly, each of the bundles 19 advantageously has the same dimensional parameters as the other bundles; i.e., the same length and outside diameters, although the latter of these can, if desired, also be varied in individual bundles. Thus it will be seen that each of the fibers has a uniform bore therethrough.

There is thus formed a permeability cell that includes a bundled multiplicity of parallel, fine, hollow fibers each of which is supported only at its terminal portions, these terminal portions being in substantial contiguous relation to each other, as are the remainders of the fiber lengths, and substantially unsupported throughout its length. Such a cell, as indicated, provides the maximum unimpaired transfer area for a given membrane material. The hollow fibers can withstand pressures of many hundreds of pounds per square inch and their wall thickness is so small that they present minimum resistance to passage of a permeable fluid component.

Referring to FIGURE 4, there is shown a preferred embodiment of an end seal for a hollow fiber bundle 19.

The header end plate 17 has a plurality of apertures of which one is shown at 24. Fitted slidably within each of the apertures 24 is a coupling fitting 25. An O-ring 26 seals the joint between the end plate 17 and coupling 25.

A bundle of hollow fibers 19 is positioned within the bore 27 of coupling 25. The individual hollow fibers 20, shown on exaggerated scale, in the bundle 19 are sealed on their exterior terminal portions 28 only to each other and to the interior of bore 27 by means of a suitable cementitious material 23, shown on exaggerated scale for purposes of illustration. Epoxy resin compositions are especially well suited for such purpose.

A sliding gate lock plate 29 having a plurality of fitting apertures 39 is slidably positioned parallel to the end plate 17 within header 14. The gate lock plate 29 is shown in locked position where it engages a projection or shoulder 30 on coupling 25. A similar slidable gate lock 31 is preferably positioned within header chamber 14 and on the side of header end plate 17 opposite to sliding gate lock plate 29. Gate lock 31 coacts with the end 32 of the fitting. Gate lock plates 29 and 31 are slidingly secured to header end plate 17 by headed studs 38 which extend through suitable slots 41 and are fixedly threaded into end plate 17 as shown in FIGURE 4. The heads of studs 38 engage the lock plates at each of the slot sides to secure the plates in position. Preferably the couplings 25 are inserted in apertures 24 and locked therein by gate lock plates 29 and 31 during assembly of the permeability cell, although it is contemplated that operating means (not shown) could extend outside of the cell through suitable seals so that the locks could be actuated externally of the cell.

The lock plates 29, 31 may be formed with a cam or other means to longitudinally adjustably position the coupling 25 in the end plates 17, 18. Or the entire end plate may be longitudinally adjustably positioned by any suitable means, such as positioning screws 40, shown in FIGURE 1. In this way, if desired, the tension upon the individual fiber bundles 19 may be varied although it is generally preferable to avoid application of positive drawing force on the fibers in the bundle in order to avoid difficulties from fiber breaks.

It will be understood that there is a similar aperture 24 and a similar coupling 25 for each of the hollow fiber bundles employed, and that the end seal and support structure is duplicated at the other header 15. This preferred embodiment presents a simple means for supporting and sealably positioning the individual bundles 19 of hollow fibers. Such an arrangement allows each bundle to be removed individually in the event of rupture or other damage to one of the bundles. Each bundle of fibers 19 together with its cementitiously terminally adjoined couplings 25, 25 in fluid-sealing relation forms a unitary permeability separatory element. Such an element is disclosed and claimed in the applicant's copending application Serial No. 57,055, filed September 19, 1960, entitled "Permeability Separatory Apparatus, Permeability Separatory Membrane Element, Method of Making the Same and Process Utilizing the Same."

Each of the header chambers 14 and 15 are formed with external circumferential flanges indicated at 42 and 43. These flanges coact in sealing relation, when the overall unit is assembled, with mating flanges 44 and 45 positioned on the exterior of casing 16. The flanges are held in sealing relation by means of bolts 46, or the like.

The outlet 12 is desirably provided with a suitable valve 47. This valve may be utilized to control the rate of withdrawal of treated fluid from the apparatus in order to regulate the concentration of the solution within casing 16.

In assembling the apparatus, as thus far described, the individual bundles 19 are sealed, as previously delineated, to their individual end fittings 2, 5, and these end fittings are assembled within the apertures in one of the end plates 17 or 18. This end plate is then positioned within its appropriate header chamber in sealing relation, and the bundles with their end portions 25 are led through chamber 16. With the end plates 17 and 18 held toward casing 16 within the header chambers, the opposite ends of the bundles are then positioned within the apertures of the other of the end plates. The sliding gate locks are reciprocated to engage the shoulders on the fittings 25 to lock them to the end plates 17 and 18. Subsequently, the header chambers are sealed to the casing by means of the above described flanges and bolts and, if desired, final adjustment of the tensioning of the bundles 19 is accomplished by means of the positioning screws 40 or their counterpart.

In most operations using permeability processes, rupture of one or of a small number of the individual membranes employed, whether they be uniplanar or tubular in construction, causes a lowering of the rejection factor of the separating apparatus which is so drastic in effect that the entire affected installation must ordinarily be shut down to replace the damaged membrane. Rupture of a single membrane in a plural membrane unit of conventional type generally lowers the rejection factor of the assembly to a far greater extent than can be tolerated for most separations. Thus, the utility of the entire permeability apparatus is disrupted. Under such circumstances, the permeate material must usually be discarded or recycled through properly operating units. Such is not the case when utilizing permeability appartus in accordance with the present invention. Each of the bundles in the fluid separating units thereof comprises, as has been indicated, many thousands or even millions of fine, hollow fibers. Thus, rupture of a single fiber in a bundle brings about only an insignificant drop in the rejection factor of the separating unit. Moreover, since apparatus constructed in accordance with the present invention tends to circumvent the factors that cause rupture in conventionally assembled membranes, it is unlikely that an intolerably large portion of fibers in any given bundle will occur so long as the applied pressure does not exceed the design capacity of the hollow fibers employed. As a matter of fact, cells made according to the invention are capable of performing continuously under high pressure for periods of many months, even years, without significant reduction of the rejection factor.

It has been found that certain polymeric materials useful as permeability membranes are subject to a type of fatigue cracking under prolonged tensile loading. Tensile loading occurs in hollow fibers when the pressure is applied in the interior bores.

The present invention is directed particularly to installations using permeable hollow fibers in which it is desired to minimize the chances of fatigue cracking. In this invention, the driving pressure is applied to the exterior walls of the hollow fibers, rather than to the interior walls as described and claimed in my copending application referred to above. When the pressure is applied to the exterior walls, the polymeric material is subjected to compression loading rather than tensile loading. Fatigue cracking has not been observed with polymeric materials subjected to compression loading.

An analysis of the stresses generated in hollow fibers will show the relative efficiency of internal and external loading, in order to determine what relative wall thickness is required under interior and exterior loading for fibers of the same diameter to withstand the same applied pressure, or conversely, what relative pressures can be applied under interior and exterior loading with hollow fibers of the same wall thickness and diameter.

Under exterior loading, the hollow fiber fails when the shear yield stress is reached in the fiber wall. When this stress is reached, the hollow fiber collapses.

Under interior loading, the hollow fiber fails when the shear ultimate stress is reached in the fiber wall. In this case, the hollow fiber ruptures.

Ductile polymeric materials in general have shear ultimate stresses somewhat higher than the shear yield stress. Often the shear ultimate stress is approximately 20% higher than the shear yield stress. Thus, it is apparent that for the same applied pressure and fiber diameter, the wall thickness of a fiber subjected to exterior loading should be 20% greater than the wall thickness of a fiber subjected to interior loading, with the same margin of safety below failure.

When, however, a permeable hollow fiber is made from a polymeric material which is subject to fatigue cracking under prolonged tensile loading, it is better to apply the pressure to the exterior of the fibers. The slight loss in efficiency is more than compensated for by the lessened chance for time-fatigue cracking with compressive loading.

In the apparatus and process of the present invention the fluid whose components are to be separated is, therefore, placed under pressure greater than osmotic pressure within the casing 16, as described above, so that the permeable component passes from the exterior of the fibers through the walls thereof and into the interior.

A further and important advantage when the pressure is applied to the exterior of the hollow fiber is related to the mechanism of failure. As described above, a hollow fiber which is subjected to exterior pressure will fail by collapsing when the shear yield stress is reached. The fiber will no longer function as a permeable membrane however. There will be no direct fluid leakage between the interior and exterior fluid phases. On the other hand, a hollow fiber in which the pressure is applied internally fails by rupture when the ultimate shear stress is reached. In this case, there is a direct fluid communication between the interior and exterior fluid phases. Direct fluid leakage is detrimental in many permeability separating processes, although as explained above, the loss of rejection factor with a ruptured hollow fiber in a plurality of hollow fibers is not as great as the loss of rejection factor with a ruptured uniplanar membrane in a conventional separating apparatus.

Due to partial collapsing or squeezing of the hollow fibers as a result of this external pressure and also due to the squeezing together of the exterior surfaces of the individual hollow fibers within each bundle of the cells described above, there is a somewhat less effective surface area for permeability separation than in the process described and claimed in my copending application. However, in many installations the additional prolonged life achieved by the present process is more desirable than the increased efficiency of the reverse procedure when the pressure is applied to the interior of the hollow fibers. This attribute of the present invention is particularly advantageous where static installations are intended to be run for a long period of time without service and/or where surge control of the applied pressure is difficult or expensive to maintain. It can be seen that the present invention will overcome ruptures which might be caused by internally applied force, since for most materials the present invention adds a safety factor of approximately 50%.

A further advantage of the present invention is apparent when consideration is given to those procedures in which suspended matter is present in the fluid whose components are to be separated. Where such fluids are applied to the interior of the hollow fibers under pressure, there is a possibility of plugging of the fine hollow fibers by the suspended matter, unless extensive filtering or settling is applied to the fluid in a preliminary treatment. In the apparatus and process of the present invention, the filter action is performed by the exterior walls of the hollow fibers.

Any accumulation of such suspended matter may be readily removed from the exterior surfaces of the fine hollow fibers my brief flushing of the interior of the casing and of the exteriors of the hollow fibers or by other standard procedures for cleaning filters, such as reverse cycling, etc.

As is apparent, the permeability cells of the present invention, when utilized in pluralities in any given separating installation, may be connected in parallel relation or may be serially connected to further purify the separated component passed sequentially through the units. In such a serial battery, the outlets 13, 13 of the first cell are connected to the inlet 11 of the second cell, etc.

There is shown in FIGURE 5 a preferred embodiment of a sea water conversion plant incorporating one or more of the cells described above used in the process of the present invention.

Expansion in population and more extensive resort to irrigation practice in recent years has placed greater emphasis on suitable techniques for the economical production of potable or agriculturally suitable water from the sea. Reverse osmosis is an attractive process for separation of water from sea water because of its potentially low energy requirements. In such an operation, sea water flows through a semi-permeable membrane and is collected relatively free of salt on the low pressure side thereof. Driving force for accomplishment of the desired procedure is provided by maintaining the pressure on the saline solution substantially above the osmotic pressure.

In spite of the general attractiveness of such operations, and despite concentrated efforts towards its practical realization, reverse osmosis (or ultrafiltration) has not generally been considered as an economical process for the recovery of fresh water from sea water. This is because of the low transfer rates obtainable from the prior art devices.

However, application of the present invention by means of the apparatus of FIGURE 5, including one or more of the permeability cells described above, offers a practical economical solution to salt water purification.

In the schematic flow diagram of FIGURE 5, the numeral 33 indicates a pretreatment plant of any suitable construction known to the art. Such pretreatment plants are usually comprised of various settling tanks, other clarifiers, filters, bacterial treatment units, etc. The raw sea water is fed to the pretreatment plant 33 and the treated effluent from plant 33 is led to a first stage pump 34. The first stage pump is preferably a low pressure unit connected directly mechanically to the output shaft of an impulse turbine 35 which is motivated by the energy from the moving stream of waste brine solution after its travel through the permeability apparatus. From the low pressure pump 34, the saline solution is fed to a second stage high pressure pump 36 which is fluid connected to the output of pump 34, driven by an electric motor or other suitable means. The saline solution under high pressure from the output second stage pump 36 is fluid connected to the inlet side 11 of a permeability cell 10 or to the inlets 11 of a battery of parallel connected cells 10 similar to those described above. Fresh water is discharged at the outlets 13, 13 and, if desired, is further cycled through a battery of additional, serially connected permeability cells. The treated saline solution is led from the outlets 12, 12 of the cell or cells to drive turbine 35. The waste brine solution from turbine 35 is led to a disposal area which can be the ocean or other source body of saline water.

In a typical sea water conversion plant patterned in accordance with the present invention along the lines above illustrated, an output of ten million gallons per day of fresh water contained in the sea water feed can readily be achieved. To attain this output, approximately 16,000 gallons per minute of sea water containing about 3.5 percent dissolved salt are fed to the pretreatment plant. This solution, after passing through the pumps, is fed to the inlet of the permeability cells at a pressure of about 835 pounds per square inch. Brackish or incompletely desalted water, from which 95 percent of the initial salt content has been removed, is withdrawn from the parallel connected cells at a rate of approximately 7,000 gallons per minute. The remaining treated brine issuing from the cells at the rate of about 9,000 gallons per minute and at a pressure of about 700 pounds per square inch is used to drive the impulse turbine. This remainder is then led to the brine disposal outlet. If desired, the waste brine solution may be used as the starting material in an evaporative plant for saline solutions to further recover fresh water and to recover the salt content thereof.

Taking into account the amortized cost of the permeability cells and other components of this system, as well as the energy losses due to the pumping system and to the conversion of mechanical energy into thermal energy resulting from membrane forced flow and from friction, such a plant can produce fresh water from sea water on an economically attractive basis which is substantially less than can be afforded by heretofore known procedures.

The efficiency and economy of such a sea water conversion plant is determined to a large extent by the material of which the fine hollow fibers are constituted and by the dimensions of such fibers.

The choice of materials for this and all of the other processes described hereinafter to which the invention is applicable is, of course, dictated by the particular separatory process in which the permeability cells are to be utilized, including a consideration of the strength which is necessary to efficient process production. Among other factors which are determinative of the material chosen for a particular separatory process are: resistance to chemical reaction with the fluid components, specific and selective permeability constants of the material for the chosen fluid components at the chosen concentration, solubility or recrystallization of the membrane material in one or more of the fluid components, and cost of the membrane material. In addition, the membrane material chosen for use in the present invention must obviously be capable of formation into thin-walled, hollow fibers.

While the various materials meeting these criteria are known to the art and readily recognizable by the skilled worker, it is believed that a listing of those preferred materials which have been tested and found satisfactory for performance as wall membrane materials for the continuously hollow fibers of the permeability cells of the present invention will provide useful, specific working examples of the practical applications of the teachings of the present invention.

Where the permeability apparatus of this invention is to be utilized in the treatment of aqueous fluid compositions, particularly in procedures pertaining to osmosis, reverse osmosis, or dialysis, a variety of materials capable of formation into hollow fibers are suitable for use as membrane materials. Such materials are generally hydrophilic in character and include: cellulose esters such as cellulose acetate, triacetate, formate, propionate, nitrate or the like, including mono, di or tri esters and mixtures of such esters; cellulose ethers such as methyl, ethyl, hydroxy-alkyl, carboxy-alkyl, or the like, including mixed cellulose ethers; regenerated cellulose; polyvinyl alcohols; polysaccharides; casein and its derivatives; and similar hydrophilic polymeric materials such as certain forms of acrylonitrile polymers. Certain of these materials are more readily formed into fine, hollow fibers than others. A highly advantageous material for conversion into hollow fibers for use in practice of the invention is cellulose triacetate. Cellulose triacetate in hollow fiber form has excellent qualities of permeation, cost, strength and resistance to chemical or solvent action. Furthermore, fiber formation is relatively easy with cellulose triacetate.

Where it is desired to separate organic components from fluids, the following illustrative materials (which are generally hydrophobic in character) are suitable: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, or mixtures thereof, methacrylate polymers, styrene polymers, various other polyolefins or polyesters or mixtures thereof, as well as various acrylonitrile polymers and cellulose derivatives, particularly mixed ether-esters, which are adequately hydrophobic in character for many applications.

Any suitable materials from the foregoing lists, as well as other suitable hollow fiber forming materials may be utilized according to the present invention for other separatory procedures including selective separation of nonionic immiscible or soluble fluid components, etc., as set forth in detail hereinafter.

Where the hollow fiber membranes are used in ion exchanging or the like separatory procedures, the reagent or reagents necessary to produce the desired ion exchange or similar separation are preferably incorporated into the fiber-forming polymeric material prior to its formation into hollow fibers. In many instances, of course, treatment of the preformed hollow fibers with liquid or by other means to convert it to ion exchange material will provide suitable selectively permeable membranes.

Fine, continuously hollow fibers of the type suitable for use in practice of the invention can be prepared, depending upon the fiber-forming material employed, by melt, dry (or evaporative) and wet spinning procedures using spinnerettes of a design that is apt for the purpose or by other techniques, as will occur to those who are skilled in the art. Such fibers may be made in accordance with the teachings of British Patent 514,638. For example, fine hollow fibers of cellulose triacetate are readily produced by a wet spinning process in which the cellulose triacetate is first dissolved in a suitable solvent to form a viscous spinning solution; after which the spinning solution is extruded into a coagulant bath through the annular space in a small annular orifice (or spinnerette). The extruded fiber coagulates or gels in the desired form of a continuously hollow, uniform-walled filament. Prior to use, the cellulose triacetate hollow fiber is washed free of solvent and of any soluble core material, if used, in a suitable bath for the purpose, advantageously one that is aqueous in nature or which consists of water. It is usually expedient to take up the hollow fibers on a reel or other suitable means for collection prior to their assembly in the cells utilized in practice of the invention.

Referring back to the rate transfer equation discussed above, it is apparent from consideration thereof that the smaller the wall thickness of the fiber, the less the resistance and the greater the transfer rate. Of course, the wall thickness must be sufficient to withstand the operational pressures to which the fiber is subject. Therefore, it is obvious that a lesser wall thickness may be used in such low pressure operations as dialysis or osmosis than in such relatively higher pressure operations as reverse osmosis.

The allowable external pressure for any hollow fiber utilized in practice of the present invention may be calculated according to the following formula:

$$\frac{t}{D} = 1/2[e^{P/2s} - 1]$$

Wherein $t$ is the wall thickness, $D$ is the inside diameter, $P$ is the applied external pressure and $s$ is the allowable shear stress.

Therefore, for a given allowable shear stress, the $t/D$ ratio fixes the allowable external pressure for the hollow fibers, regardless of the diameter. Accordingly, as is readily discernible, hollow fibers of the same $t/D$ ratio will withstand the same external pressure. Thus, the smaller the diameter of the fiber, the smaller the corresponding wall thickness that is necessary and the lower the resistance to permeation.

The optimum dimensions for the hollow fibers will vary somewhat according to the particular process in which they are utilized and will also vary somewhat according to the ultimate strength of the fiber forming material.

In general, the uniform wall thickness of the fibers should be held to the limits of between about one-third to about one-eighth of the outside diameter of the hollow fiber. Also, in general, the hollow fibers should be able to withstand a minimum external pressure of at least about 100 pounds per square inch without collapsing. In accordance with the above-noted parameters of rate transfer, the maximum outside diameter of the hollow fibers should, advantageously, not exceed 300 microns. In fact, a more advantageous range of outside diameter is from about 10 to about 50 microns. The uniform wall thickness of the hollow fibers may range from a minimum of about 1 micron to a maximum of about 80 microns. Decrease or increase from the specified limits will lead to an increased chance of collapsing on the minimum side and to a decrease in mass transfer rate on the maximum side.

The most advantageous range of wall thickness of the hollow fibers for most purposes is from about 2 to about 20 microns, with a generally suitable and desirable working range of from about 1 to about 50 microns.

As is apparent, the satisfactory ranges of dimensions for use encompass hollow fibers that, in actuality, are many times smaller than human hair. Prior hereto, hollow fibers of such minute dimensions have never been utilized for commercial purposes. The minimal dimensions of the hollow fibers used in practice of the invention allow the formation of bundles of unsupported hollow fibers which, as has been indicated, increase the mass tranfer rate for a given cubic volume of permeability apparatus many times that of prior art devices.

Regardless of the specific dimensional parameters of the fibers involved in any hollow fiber bundle used in accordance with the present invention, the transfer area of the bundles (or of a plurality of bundles assembled in cells) may be reckoned in ways analogous to that illustrated in the following calculations, using for purposes of illustration hollow fibers having an outer diameter (O.D.) of 13 microns, an inner diameter (I.D.) of 9 microns, a wall thickness of 2 microns, a length of 1 foot and a cylindrical bundle size of 1 inch diameter:

| Transfer Area | Installation "A" | Installation "B" |
|---|---|---|
| 1. Fiber spacing in bundle | 2×O.D. | 1.5×O.D. |
| 2. Number of fibers in bundle | 8.65×10$^5$ | 1.54×10$^6$ |
| 3. Transfer area per bundle | 80 ft.$^2$ | 142 ft.$^2$ |
| 4. Bundle spacing in cell | 2×O.D. | 1.5×O.D. |
| 5. Total transfer area per unit volume of cell. | 3,300 ft.$^2$/ft.$^3$ | 10,500 ft.$^2$/ft.$^3$ |

As has been indicated in the foregoing, the total transfer area per unit volume available from a flat membrane assembly (assuming a 1 millimeter unsupported membrane spacing) is about 305 ft.$^2$/ft.$^3$.

It should be further emphasized that when the invention is used for processes carried out by direct osmosis and/or dialysis, the absence of support of the bundles of hollow fibers except at their extreme terminal portions and the uniformity of dimensions throughout the fiber length provide a system in which there is countercurrent flow between the fluid to be treated on the outside of the fibers and the treating fluid on the inside of the fibers. This insures a maximum uniform transfer rate along the entire length.

The system and separatory procedure of the present invention is successfully applicable to a wide range of separating operations. A few such applications actually accomplished are illustrative in the following tabulation. In each instance, for purposes of uniform operation and to aid in comparison, the tests were conducted using a single 350 fiber bundle of cellulose triacetate fibers, each of which had an outside diameter of about 45 microns and a wall thickness of about 10 microns. The yield of permeate obtained in each of the listed illustrations is that obtained from the entire fiber bundle.

*Illustration 1*

Material _____ Apple cider.
Osmotic pressure _____ 380–400 p.s.i.
Applied pressure _____ 425 p.s.i.
Permeation rate _____ 0.04 cc./hr.
Permeate _____ White, negative for sugar, refractive index-distilled water.

*Illustration 2*

Material _____ Coffee.
Osmotic pressure _____ 90 p.s.i.
Applied pressure _____ 210 p.s.i.
Permeation rate _____ 0.06 cc./hr.
Permeate _____ Substantially only water; no odor; no residue on evaporation.

*Illustration 3*

Material _____ Orange juice.
Osmotic pressure _____ 200 p.s.i.
Applied pressure _____ 380 p.s.i.
Permeation rate _____ 0.06 cc./hr.
Permeate _____ Substantially only water; very slight trace of sugar.

*Illustration 4*

Material _____ 2 percent $CuSO_4$ solution.
Osmotic pressure _____ 85 p.s.i.
Applied pressure _____ 230 p.s.i.
Permeation rate _____ 0.4 cc./hr.
Permeate _____ Water white; rejection factor 99.4 percent Cu.

*Illustration 5*

Material _____ 2 percent $NH_4NO_3$.
Osmotic pressure _____ 175 p.s.i.
Applied pressure _____ 320 p.s.i.
Permeation rate _____ 0.13 cc./hr.
Permeate _____ 98.4 percent rejection of both $NH_4$ and $NO_3$.

*Illustration 6*

Material _____ 2 percent glycine.
Osmotic pressure _____ 65 p.s.i.
Applied pressure _____ 215 p.s.i.
Permeation rate _____ 0.8 cc./hr.
Permeate _____ 60 percent rejection glycine.

*Illustration 7*

Material _____ 70 percent styrene/30 percent butadiene latex having average particle size of about 0.3 micron, diluted to 5 percent solids.
Osmotic pressure _____ 40 p.s.i.
Applied pressure _____ 260 p.s.i.
Permeation rate _____ 0.7 cc./hr.
Permeate _____ Water white; turbidity test indicating 99 percent rejection of latex.

*Illustration 8*

Permeation tests were conducted on aqueous sodium chloride solutions using both a bundle of relatively large, thick-walled fibers having a relatively low permeation rate and a larger bundle of small, thinner-walled fibers. The results were as follows:

(1) Permeation test with relatively large, thick-walled fibers giving low permeation rate:
 (a) Number of fibers _____ 9.
 (b) Outside diameter _____ 290 microns.
 (c) Inside diameter _____ 150 microns.
 (d) Length _____ 8 inches.
 (e) Feed solution  1 percent NaCl.
 (f) Osmotic pressure _____ 100 p.s.i.
 (g) Applied pressure _____ 300 p.s.i.
 (h) Permeation rate _____ 0.0015 cc./hr.
 (f) Permeate _____ 97 percent rejection of NaCl.

(2) Permeation test with a larger bundle of small, thin-walled fibers:
 (a) Number of fibers _____ 1500.
 (b) Outside diameter _____ 48 microns.
 (c) Inside diameter _____ 32 microns.
 (d) Length _____ 30 centimeters.
 (e) Feed solution _____ 1 percent NaCl.
 (f) Osmotic pressure _____ 100 p.s.i.
 (g) Applied pressure _____ 520 p.s.i.
 (h) Permeation rate _____ 1.28 cc./hr.
 (i) Permeate _____ 97 percent rejection of NaCl.

Numerous additional illustrations are available to show the efficiency of the systems of the present invention and the significant benefit and advantage to be obtained in its practice.

Besides the above illustrations, numerous dialytical operations can be performed satisfactorily using the system of the present invention.

The following is set forth as a specific illustration of such operation:

*Illustration 9*

Caustic soda (NaOH) is recovered from a viscose press liquor using, as a feed solution a liquor containing 16.5–17 weight percent NaOH and 1.5–2.5 weight percent hemicellulose. The fiber bundle employed is made of cellulose triacetate and contains about a million individual hollow fibers each having dimensional parameters equivalent to those described in the second part of the foregoing illustration. The feed liquor is forced against the fiber exteriors under a forced pressure of about 100 p.s.i. The diffusate collected from inside the fibers contains about 8–9 weight percent NaOH and only about 0.06–0.08 weight percent hemicellulose.

While it is difficult to correlate completely the significant test results of the systems of the present invention relative to the prior art systems, it may be stated generically that comparative dialysis tests based upon the same time period indicate that the systems of the invention are much more efficient and satisfactory than prior art devices and procedures.

It should be noted that, in each of the above exemplifying illustrations, the pressure used as driving force was only slightly higher than the inherent osmotic pressure. Further experiments following each of the illustrations set forth have provided the same general results as the results obtained in the saline water separation discussed above. Thus, at least the same quality permeate is obtained, regardless of fluid system being separated, when greater driving forces are utilized.

As set forth above, the system of the present invention is particularly suitable for removal of solvent from slurries, suspensions and solutions, particularly where these solutions are associated with particulate material. As illustrations of such processes there may be mentioned the concentration of aqueous latex suspensions, fruit and vegetable juices and sewage sludges. These processes may be carried out by direct osmosis and/or dialysis.

The fluid to be treated is fed into the inlet 11 of the separatory cell described above and the treated fluid exits at outlets 12. Flowing counter-currently inside of the fibers 20 is a solution which contains the same solvent as the material to be concentrated. In this solution the activity of the solvent is lower than in the material to be concentrated. Thus, an activity gradient is created and solvent flows by osmosis from the outside to the inside of the fibers. This solvent is then carried off through the discharge outlets 13. Of course, the material from which the hollow fibers are made must be permeable to the solvent and relatively impermeable to the solutes. In such a process, any insoluble material carried by the fluid will, of course, not be able to permeate the walls of the hollow fibers. If such material collects upon the exterior surfaces of the hollow fibers, it may be readily removed by reverse flow, flushing or the like. In such processess the apparatus, therefore, functions both as a filter and as a permeability separatory apparatus.

In the practice of the present invention, the solvent solution flowing through the fibers desirably contains a salt in solution so as to produce and control the preferential osmotic activity gradient. Where such a process is used the solvent salt solution is fed into one of the headers 14 or 15 at sufficient pressure to maintain a flow rate therethrough, and the diluted solution is then discharged from the other of the two headers.

The following example relating to the concentration of orange juice by osmosis serves to illustrate such a process utilizing the apparatus of the present invention. The use of this process for concentrating orange juice has distinct advantages over present commercial evaporative procedures, since no heat elevation is involved, thus avoiding deterioration of the concentrate.

Orange juice is fed into the casing of a cell wherein the hollow fibers are formed from cellulose triacetate and have an outside diameter of 14.4 microns, and inside diameter of 10.0 microns, and a water permeating coefficient of $2.5 \times 10^{-14}$ centimeters per second. Sufficient fibers are utilized to provide a transfer area of $2.6 \times 10^6$ square feet. Such a cell occupies approximately 225 cubic feet, where there is a fiber spacing of twice the outer diameter.

A 6% sodium chloride solution having an osmotic pressure of approximately 50 atmospheres is fed into the interior of the hollow fibers, preferably from the lefthand inlet as view in FIG. 1, at a flow rate of 200 gallons per minute. The orange juice is fed into the interior of the casing and around the exteriors of the fibers at a rate of 100 gallons per minute. The orange juice has an initial concentration of sugar of approximately 11.5% and has an osmotic pressure of 10.3 atmospheres.

With the above feeds there is obtained on the outlet side of the casing a flow rate of 27.4 gallons per minute of concentrated orange juice having a 42% sugar content and having an osmotic pressure of 45 atmospheres. The discharge from the interior of the hollow fibers has a flow rate of 272.6 gallons per minute and a sodium chloride concentration of 4.4% and having an osmotic pressure of 35 atmospheres.

The present invention as utilized for direct osmosis combined with dialysis is illustrated by the example of the following artificial kidney. This kidney is designed to remove urea and related substances from blood by dialysis and to remove edema water from blood by osmosis.

The kidney is constructed of a cell in accordance with the foregoing teachings wherein the hollow fibers are formed of regenerated cellulose and have an outer diameter of 200 microns, an inner diameter of 160 microns, and an active length of 5.8 centimeters. A total transfer area of 15,100 square centimeters is provided by utilizing $5.1 \times 10^4$ hollow fibers.

The regenerated cellulose material is permeable to urea and related substances and to water, but is impermeable to plasma protein and to blood cells. It is also impermeable to the substance dissolved in the solution which passes through the hollow fibers. This solution, which is fed to the hollow fibers under sufficient pressure to cause a desired flow rate, is preferably an 8% aqueous solution of polyethylene glycol.

The blood flow rate used is 350 milliliters per minute and the glycol solution flow rate is 1750 milliliters per minute. The product discharged from the casing consisted of blood having 86% of the detectable urea and related substances removed therefrom and having water removed therefrom at a rate of 40 milliliters per minute.

The systems of the present invention may be applied successfully to the following general types of separatory operations, some of which include those specifically illustrated above.

I. Separation of the components of aqueous saline solutions:
  A. With osmotic hollow fibers:
    1. Recovery of water from saline solutions:
      a. Desalting sea water
      b. Desalting brackish waters.
    2. Recovery of salts from saline solutions:
      a. Recovery of sodium chloride and/or minor constituents from sea water.
      b. Recovery of salts from other brines including solutions of alkali metal and alkaline earth halides, carbonates, sulfates, borates and the like, such as KCl, KBr, NaCl, $Na_2CO_3$, $Na_2SO_4$, $Na_2B_4O_7$, $Na_3PO_4$, NaBr, NaF, and $CaCl_2$.
    3. Concentration of industrial saline and other chemical solutions, including caustic (i.e., NaOH, KOH, etc.), ammonium and nitrate fertilizers, leach liquors including uranium and rare earth salts, orthophosphoric acid, sodium phosphates, copper sulfate (i.e., $CuSO_4$), monosodium glutamates, sodium thiosulfates, sodium chromates, sodium chlorates, lithium carbonate, alum, aluminum sulfates, ammonium chloride, ammonium nitrate and the like.
    4. Industrial separations, including concentration by heavy water, glycerine, lactic acid, tanning extracts, alcohol, hydrogen fluoride, glycols and so forth.
  B. With hollow fibers having ionic group substitution attachments:
    1. Ion exchange processes, including:
      a. Water softening (i.e., exchanging $Na^+$ for $Ca^{++}$, etc.).
      b. Anionic softening.
      c. Recovery of magnesium from sea water.
      d. Recovery of caustic (NaOH) from line (CaO) and salt (NaCl).
    2. Ionexclusion coupled with reverse osmosis, including:
      a. NaCl from glycerine.
      b. Demineralization of $H_2O$ or any other nonionic solvent of low molecular weight.
      c. All separatory procedures listed above for ionic materials with osmotic fibers and a reverse osmosis process may also be accomplished using ionic filters.

II. Separation or concentration of heat sensitive materials, regardless of ionic components:
  A. Biological:
    1. Medical:
      a. Artificial kidney.
      b. Sterile solutions.
      c. Isolation of virus or bacteria.
      d. Fractination of blood.
      e. Serum production.
    2. Pharmaceuticals:
      a Concentration or separation of alkaloids, glucosides, hormones, vitamins, vaccines, amino acids, antisera, antiseptics, proteins, organo metallic compounds, antibiotics.
      b. Continuous fermentation.
  B. Food industries:
    1. Concentration of natural fruit and vegetable juices including: orange, grapefruit, grape, apple, tomato, carrot, cabbage, celery, etc.
    2. Concentration of sugar solutions.
    3. Beverage concentration, including milk and extracts of: coffee, tea, etc.

III. Selectively permeable separation of organic matters:
  A. Separation of materials which normally azeotrope:
    1. Alcohol-water solutions.
    2. Ethanol-isopropanol-water ternary azetropes.
  B. Close boiling mixtures, such as meta- and para-xylenes, and the like.
  C. Recovery of solvents from organic solution.
  D. Organic contaminent removal from ethanol or propanol oxide streams.
  E. Petroleum fractionation.
  F. Separation of ammonia ($NH_3$) values from organic amines.

IV. Processing of industrial waste streams, including wastes from radioactive materials, sulfite pulps, fissionables, cannery wastes, etc.

V. Dialysis:
  A. Recovery of caustic from viscose or mercerizing solutions.
  B. Recovery of acids from metal treating processes.
  C. Starch—dextrine conversion.
  D. Skimmed milk concentration.
  E. Removal of salt from sugar solutions.
  F. Blood dialysis of artificial veins, arteries, etc.

The foregoing list of applications of the systems of the present invention is not, nor is it intended to be, nor should it be construed as being, all-inclusive. Rather, this list represents those commercial procedures to which the present invention can be successfully applied. Obviously, the teachings of this invention may also be successfully applied to other procedures wherein a permeability separatory apparatus of the presently contemplated variety may be of utility.

What is claimed is:

1. A process of osmotic separation comprising passing a fluid having a plurality of components into contact with the exterior walls of a multiplicity of bundles of open-ended continuously hollow fibers which are permeable to at least one of the fluid components while supporting said fibers at the terminal portions thereof only, and simultaneously passing through the interiors of said hollow fibers a second fluid containing the same solvent as said first fluid, and increasing the osmotic activity gradient between the exterior and interior of said fibers by dissolving a solube compound in said second fluid.

2. The process of claim 1 wherein said first fluid comprises fruit juices and said second fluid comprises a saline solution.

3. An osmotic and dialysis process for the treatment of fluid to remove urea and related substances by dialysis and to remove edema water by osmosis, comprising passing said untreated fluid into contact with the exterior walls of a multiplicity of bundles of open-ended, continuously hollow, fine fibers formed of a material permeable to said water and to said urea and related substances but impermeable to plasma protein and to blood cells, and simultaneously passing through the interior of said hollow fibers an aqueous solution of polyethylene glycol.

4. A reverse osmosis process comprising passing a fluid having a plurality of components into contact with the exterior walls of a multiplicity of bundles of open-ended, continuously hollow, fine fibers which are permeable to at least one of the fluid components while supporting said fibers at the terminal portions thereof only, and applying to said fluid a pressure in excess of osmotic pressure and wherein said fibers contain ion-exchanging constituents.

5. A reverse osmosis permeability separatory apparatus comprising a permeability cell including a casing, selectively permeable means within said casing consisting of a multiplicity of bundles of substantially parallel, continuously hollow, fine fibers having terminal portions and interior bores, means to support said hollow fibers at said terminal portions with their unsupported lengths extending through said casing, means to feed untreated fluid having selectively permeable components to the interior of said casing, means to apply to said fluid within said casing a pressure in excess of osmotic pressure, means to collect fluid which is permeated into said hollow fiber bores, means to discharge treated fluid from said casing, and means associated with said discharge means to control the rate of flow of fluid through said casing, each of said bundles consisting of a multiplicity of the said fibers.

6. A permeability separatory apparatus comprising a first header, a second header, a casing supporting said first and second headers at the ends of said casing, each of said headers having end plates therein positioned between said header and said casing, a passage extending through said first plate, a second aligned passage extending through said second plate, a multiplicity of bundles of selectively permeable, continuously hollow, fine fibers positioned within said casing, said hollow fibers having open, opposite terminal portions, means to mount said bundle with said terminal portions extending through said passages in fluid sealed relation to said header plates, a first fluid passage in communication with said first header, a second fluid passage in communication with said second header, a third fluid passage positioned on one side of said casing, and a fourth fluid passage positioned on the opposite side of said casing.

7. A permeability separatory apparatus comprising a first header, a second header, a casing supporting said first and second headers at the ends of said casing, each of said headers having end plates therein positioned between said header and said casing, a plurality of passages extending through said first end plate and a second plurality of aligned passages extending through said second end plate, a multiplicity of bundles of selectively permeable, continuously hollow, fine fibers positioned within said casing, said hollow fibers having open, opposite terminal portions, means to mount said bundles with said terminal portions extending through said passages in fluid sealed relation to said header plates, a first fluid passage in communication with said first header, a second fluid passage in communication with said second header, a third fluid passage positioned on one side of said casing and in communication therewith, and a forth fluid passage positioned on the opposite side of said casing in communication therewith.

References Cited by the Examiner

UNITED STATES PATENTS

| | | | |
|---|---|---|---|
| 2,411,238 | 11/1946 | Zender | 210—22 |
| 2,510,262 | 6/1950 | Sollner | 210—22 X |
| 2,864,506 | 12/1958 | Hiskey | 210—23 X |
| 2,880,501 | 4/1959 | Metz | 29—450 |
| 2,972,349 | 2/1961 | De Wall | 128—214 |

OTHER REFERENCES

Best, "Physiological Basis of Medical Practice," sixth ed., The Williams and Wilkins Co. (Baltimore) 1955, chapter 35, kidney structure.

Carman, "Resistance of Tubes to Collapse," University of Illinois Engineering Experiment Station, Bulletin No. 5, June 1906, pages 1–26, 12–17, particularly relied on.

MORRIS O. WOLK, *Primary Examiner.*

CHARLES F. KRAFT, *Examiner.*